US008054438B2

United States Patent
Lee et al.

(10) Patent No.: US 8,054,438 B2
(45) Date of Patent: Nov. 8, 2011

(54) DISPLAY APPARATUS COMPRISING A SEAL LINE HAVING A FIRST PROTRUSION INCLUDING A CROSS POINT ON A FIRST SIDE OF THE SUBSTRATE AND A SECOND PROTRUSION COMPRISING AN OPENING OF THE SEAL LINE ON A SECOND SIDE

(75) Inventors: Seong-Jun Lee, Seoul (KR); Jin Jeon, Suwon-si (KR); Yong-Je Jeon, Suwon-si (KR); Sung-In Ro, Gunpo-si (KR); Sun-Ja Kwon, Gunpo-si (KR); Sang-Ho Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 656 days.

(21) Appl. No.: 11/676,743

(22) Filed: Feb. 20, 2007

(65) Prior Publication Data

US 2007/0195256 A1 Aug. 23, 2007

(30) Foreign Application Priority Data

Feb. 20, 2006 (KR) .................. 10-2006-0016356

(51) Int. Cl.
*G02F 1/1339* (2006.01)
*H01J 9/26* (2006.01)
*H01J 1/62* (2006.01)
*H01J 63/04* (2006.01)

(52) U.S. Cl. .......... 349/154; 349/190; 445/25; 313/512

(58) Field of Classification Search ............... 349/153, 349/154, 190; 445/25; 313/512
See application file for complete search history.

(56) References Cited

U.S. PATENT DOCUMENTS

| 5,985,069 | A * | 11/1999 | Kawabe et al. ............. 156/109 |
|---|---|---|---|
| 6,184,954 | B1 * | 2/2001 | Inoue et al. ................. 349/86 |
| 7,034,914 | B1 * | 4/2006 | Lee et al. ................... 349/153 |
| 2002/0071078 | A1 * | 6/2002 | Chung et al. ............... 349/123 |
| 2005/0110937 | A1 * | 5/2005 | Yoon et al. ................. 349/153 |
| 2005/0151919 | A1 * | 7/2005 | Lee et al. ................... 349/153 |
| 2006/0139553 | A1 * | 6/2006 | Kang et al. ................. 349/149 |
| 2006/0139556 | A1 * | 6/2006 | Ahn et al. ................... 349/153 |
| 2007/0121054 | A1 * | 5/2007 | Jang et al. .................. 349/187 |

FOREIGN PATENT DOCUMENTS

CN 1627137 A 6/2005

* cited by examiner

*Primary Examiner* — Mark Robinson
*Assistant Examiner* — Dennis Y Kim
(74) *Attorney, Agent, or Firm* — Cantor Colburn LLP (57) ABSTRACT

A liquid crystal display (LCD) apparatus and a method of manufacturing the same include a seal line having two protrusions, one of the protrusions having a liquid crystal (LC) injection hole. Moreover, the LCD apparatus having the seal line constitutes a closed loop. The display apparatus and the manufacturing method thereof increase production yields because the number of apparatus substrates for the display apparatus obtained from a mother substrate is increased by minimizing a distance between two adjacent apparatus substrates on the mother substrate. The method of manufacturing an exemplary LCD apparatus includes a one drop filling method or a vacuum injection method.

23 Claims, 10 Drawing Sheets

DISPLAY APPARATUS COMPRISING A SEAL LINE HAVING A FIRST PROTRUSION INCLUDING A CROSS POINT ON A FIRST SIDE OF THE SUBSTRATE AND A SECOND PROTRUSION COMPRISING AN OPENING OF THE SEAL LINE ON A SECOND SIDE

This application claims priority to Korean Patent Application No. 10-2006-0016356, filed on Feb. 20, 2006, and all the benefits accruing therefrom under 35 U.S.C. §119, the contents of which in its entirety are herein incorporated by reference.

BACKGROUND OF THE INVENTION

1. Field of the Invention

The present invention relates to a display apparatus and method of manufacturing thereof. More particularly, the method is an improvement in drawing a seal line efficiently in order to obtain more panels from a mother substrate and reduce the process time for manufacturing a liquid crystal display ("LCD") apparatus.

2. Description of the Related Art

Generally, a display apparatus is an interface apparatus which displays images which can be perceived by our eyes through processing of data from information sources.

There are many typical display apparatuses such as a liquid crystal display ("LCD"), a plasma display panel ("PDP"), and an organic light emitting device ("OLED"). An LCD device has a matrix of liquid crystal cells arranged as light shutters using the characteristics of liquid crystal such as optical anisotropy and electrical anisotropy.

In order to accomplish this goal, an LCD comprises a pair of substrates, electrodes, a liquid crystal layer, and a seal line. A pair of substrates face each other, and electrodes are formed on one or each of the substrates. When the voltages are loaded on the electrodes, the liquid crystals of the liquid crystal layer change their alignments, control the transmittance of light, and are enclosed by the seal line which prevents escape of the liquid crystal and maintains a cell gap between the substrates. The liquid crystals are enclosed by the two methods; one is a "vacuum injection method" which injects liquid crystals into the cell gap between the two substrates through the injecting hole of the seal line, the other is a "one drop filling method" in which an amount of liquid crystals are disposed on one substrate and then the other substrate is assembled on it.

Figure 1A:
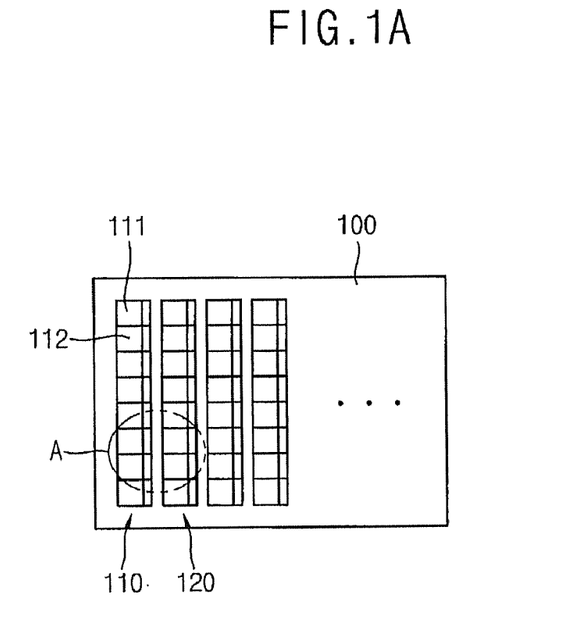
FIG. 1A through 1C are plan view layouts of a plurality of display apparatus substrates arranged on a mother substrate by a drawn seal line according to a conventional method.
Figure 1B:
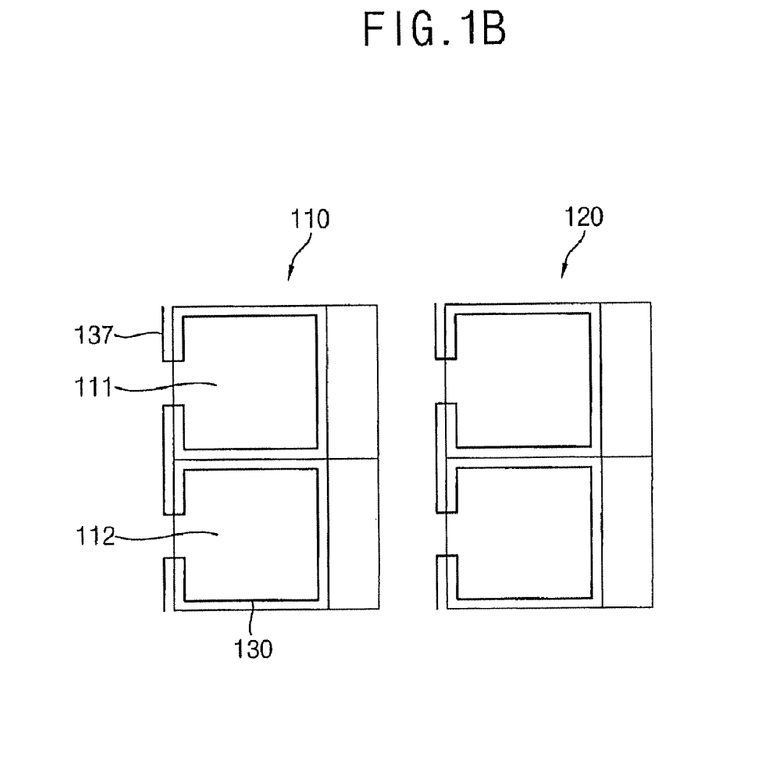
Figure 1C:
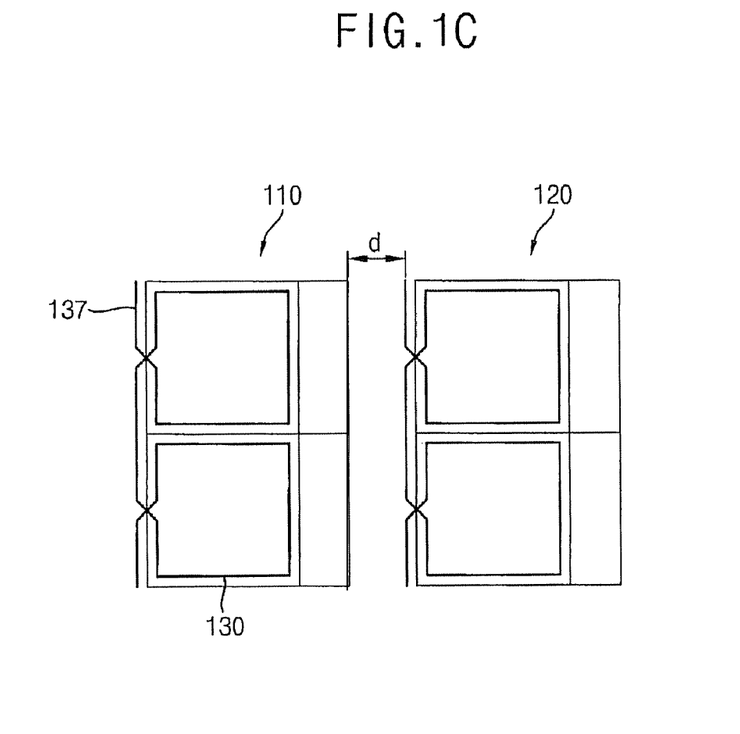

In general, as shown FIG. 1A, a plurality of display apparatus substrates 111 and 112, each of which has at least one of electrode is formed thereon, are made from a mother substrate 100. A seal line is formed on each of the substrates. The plurality of display apparatus substrates 111 and 112 is arranged regularly above and below in a line on the mother substrate 100, like a stick shape. In this specification a "stick" is referred to as a line of those display apparatus substrates 110 and 120. Therefore, a plurality of sticks is formed having the same intervals of the display apparatus substrates 111 and 112 on the mother substrate 100. As shown in FIGS. 1B and 1C, a seal line 130 is continuous to a dummy line 137 because the seal line 130 is drawn without a break. FIG. 1B depicts the seal line 130 formed by a vacuum injection method. As shown in FIG. 1B, the seal line 130 is drawn around the display apparatus substrate and has a plurality of openings as injection holes when the liquid crystal is filled. FIG. 1C depicts the seal line 130 formed by the one drop filling method, showing the seal line as a closed loop around the display apparatus substrate without an injection hole in contrast with FIG. 1B.

A breaking process is used to separate the adjacent sticks 110 and 120 from each other and from the mother substrate 100. However, a design tolerance of the distance between adjacent sticks 110 and 120 with consideration of a margin for the breaking process of the substrate needs to be considered in order to maximize production yields. Conventionally, the distance between adjacent sticks is about 5 mm, which is the distance between the dummy line 137 of the one stick 120 and the adjacent stick 110. The distance therebetween effects the yield per glass mother substrate and the process time for drawing the seal line 130.

BRIEF SUMMARY OF THE INVENTION

It is therefore an aspect of the present invention to provide a display apparatus which is capable of increasing production yields.

Another aspect of this invention provides a method of manufacturing the display apparatus, which increases a number of products obtained from a mother substrate.

In accordance with an aspect of the present invention, there is provided an exemplary embodiment of a display apparatus which includes a substrate, a seal line formed on the substrate, wherein the seal line has a protrusion including an opening of the seal line and a dummy pattern on an opposite side of the protrusion, and an end seal filling the opening.

In the above exemplary embodiment, the dummy pattern may have two branch patterns from a point, and a gate driving circuit may be included under the seal line.

In accordance with another aspect of the present invention, there is provided another exemplary embodiment of a display apparatus which includes a substrate, a seal line formed on the substrate, which has a first protrusion including a point of contact on a side of the substrate and a second protrusion including an opening on an opposite side of the first protrusion, and an end seal which fills the opening.

In the above exemplary embodiment, the cross point may form vertical angles being the same as one another or form vertical angles being different each other, or a gap of a bottom of the first protrusion and a gap of a bottom of the second protrusion may be the same or different from each other.

Moreover, the display apparatus may further include a gate driving circuit under the seal line, or a non-display area having a data driving circuit. In this case, the non-display area may be located outside of the seal line and the seal line may contain spacers.

In accordance with another aspect of the present invention, there is to provided an exemplary embodiment of a display apparatus including a substrate and a seal line formed on the substrate, which is a closed loop including at least a protrusion on a side of the substrate. Moreover, the seal line on an opposite side of the protrusion may contact a cutting line.

According to yet another aspect of this invention, there is provided an exemplary embodiment of a display apparatus including a substrate, and a seal line formed around the substrate, which is a closed loop including a first protrusion on a side of the substrate and a second protrusion on an opposite side of the first protrusion.

In this exemplary embodiment, the first protrusion and the second protrusion may form a mountain figure or an arc figure relative to a proximate portion of the seal line, or a gap of a bottom of the first protrusion and a gap of a bottom of the second protrusion may be the same.

Moreover, the display apparatus may further include a gate driving circuit under the seal line and/or the first protrusion may include a cross point of the seal line. In this case, the cross point may form vertical angles being different from each other, and the vertical angles of the first protrusion may be different from that of the second protrusion.

In the case that the gap of the bottom of the first protrusion is different from that of the second protrusion, the display apparatus may further include a gate driving circuit under the seal line, and the vertical angles of the first protrusion may be the same or different from that of the second protrusion.

In addition, the display apparatus may further include a non-display area having a data driving circuit in this exemplary embodiment, and the non-display area is located outside of the seal line.

In accordance with an aspect of manufacturing for a display apparatus of this invention, the method includes preparing a mother substrate formed of glass including a plurality of display apparatus substrates located adjacent to each other in a vertical line, drawing a seal line, which is drawn by a nozzle which starts at a point around one of the display apparatus substrates, surrounds an adjacent one of the display apparatus substrates, and completes a plurality of closed loops by having at least a point of contact except at a starting point, assembling the mother substrate with an upper mother substrate; and separating the assembled mother substrate into at least two display apparatus substrates one of which includes an injection hole and another one of which has the point of contact.

Preferably, the point of contact may have vertical angles different from that of an opposite side of a cutting line.

Preferably, the total angle of vertical angles at the point of contact may be under 90°.

Preferably, the point of contact may be a crossing point when the seal line is drawn.

Preferably, the method may further include injecting liquid crystal into the assembled substrate through the injection hole.

In accordance with an aspect of manufacturing for a display apparatus according to another exemplary embodiment of this invention, the method includes preparing a first mother substrate including a plurality of display apparatus substrates located adjacent to each other in a vertical line, drawing a seal line, which is drawn by a nozzle which starts at a point around one of the display apparatus substrates, surrounds an adjacent one of the display apparatus substrates, and completes a plurality of closed loops by having a point of contact except at a starting point, assembling the first mother substrate with an upper mother substrate, and separating the mother substrate into at least two display apparatus substrates along a cutting line which runs through the point of contact.

Preferably, the point of contact has a vertical angle which is different from that of an opposite side to the cutting line.

Preferably, the total angle of vertical angles at the point of contact is under 90°.

Preferably, the point of contact is a crossing point when the seal line is drawn.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A display apparatus and a method of manufacturing thereof according to preferred exemplary embodiments of the present invention will be described below with reference to FIG. 2 to FIG. 12.

Referring to FIG. 2 through FIG. 7C, a display apparatus and a method of manufacturing thereof will be described below in more detail according to exemplary embodiments of this invention.

Figure 2:
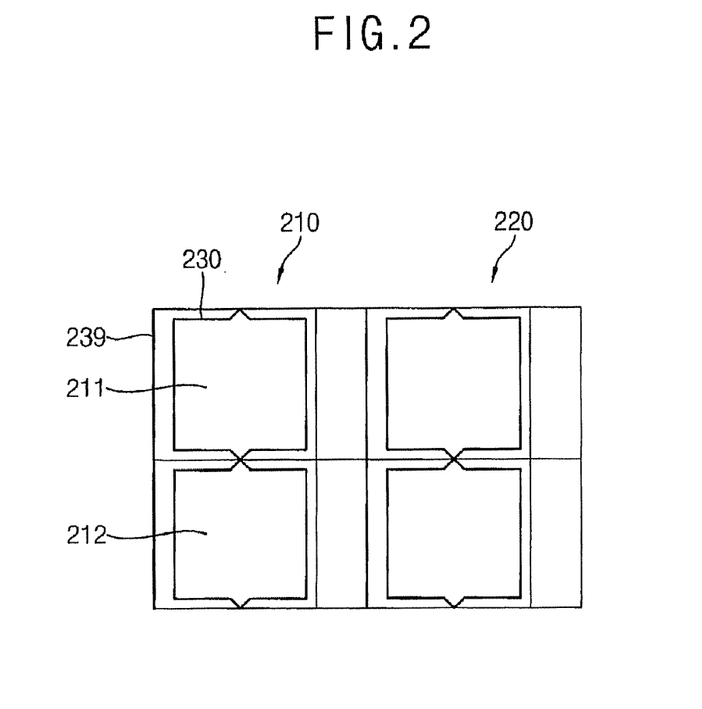
FIG. 2 is a plan view layout showing a plurality of display apparatus substrates arranged on a mother substrate by a drawn seal line according to one exemplary embodiment of this invention.

FIG. 2 is a plan view layout showing a plurality of display apparatus substrates arranged on a mother substrate by drawn seal line according to one of embodiments of this invention. As shown in FIG. 2, a plurality of display apparatus substrates is formed on a mother substrate 210 in a line, which is called a stick.

A first stick 210 and a second stick 220 are arranged on the mother substrate. A seal line 230 is drawn around of each of display apparatus substrates in a stick, and is constituted by closed loops each of which corresponds to a display apparatus substrate. Comparing to the conventional seal line in FIG. 1C, the seal line 230 protrudes and forms a cross point or a point of contact between adjacent apparatus substrates with respect to a stick without any dummy seal line 137.

The constitutions of display apparatus substrates are different along kinds of the display apparatus. For example, in an active matrix LCD, the display apparatus substrate comprises pixel electrodes and thin film transistors ("TFTs") in an array. Generally a display apparatus substrate is divided into two areas, one of which is a display area which displays images, the other of which is a non-display area in which driving circuits for the TFTs or integrated circuits ("ICs") are formed thereon or connected thereto. Especially, in the case in which driving circuits for a gate line or a data signal line of TFT array in the display area are comprised of TFTs on the display apparatus substrate, the seal line is preferably formed directly on the driving circuits for increasing reliability. This is required when the driving circuits for the gate lines are made of amorphous silicon TFTs.

Figure 3:
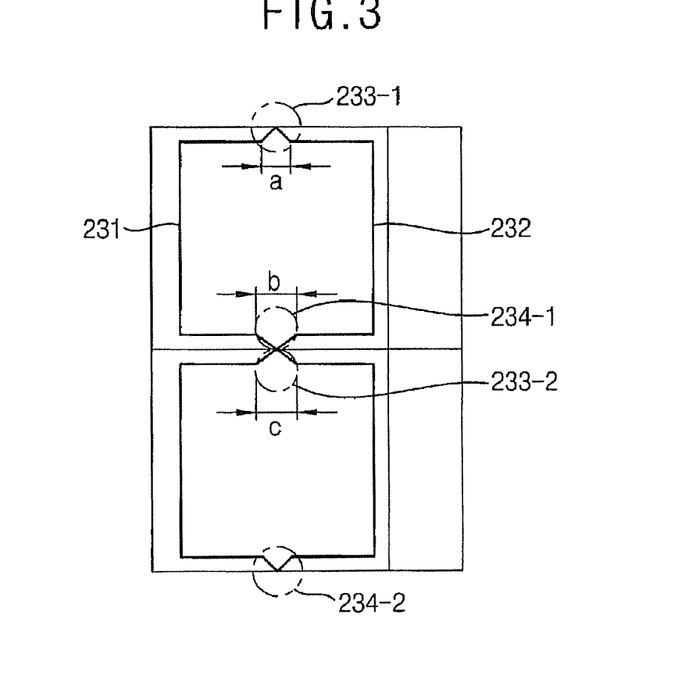
FIG. 3 is a plan view layout showing a plurality of display apparatus substrates arranged on a mother substrate by a drawn seal line according to another exemplary embodiment of this invention.
Figure 4:
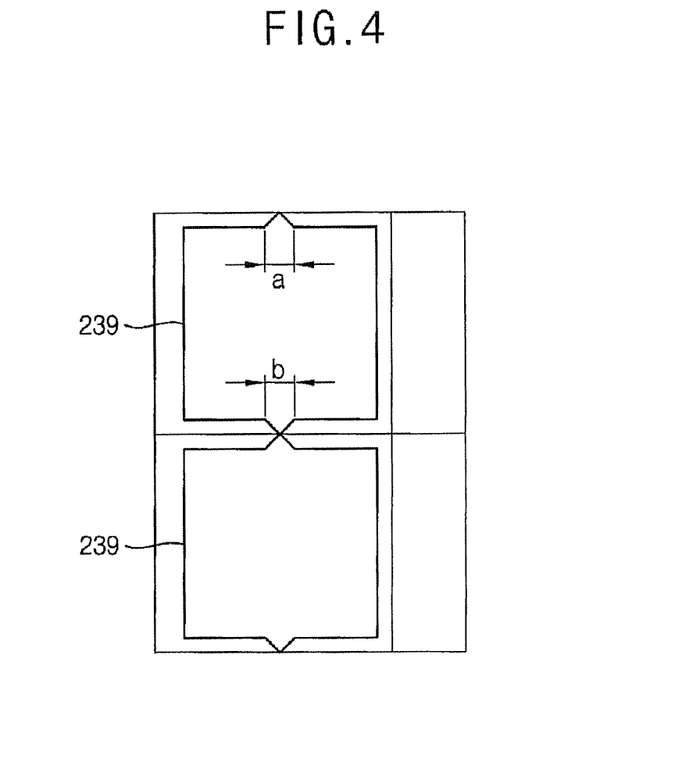
FIG. 4 is a plan view layout showing a plurality of display apparatus substrates arranged on a mother substrate by a drawn seal line according to another exemplary embodiment of this invention.
Figure 5:
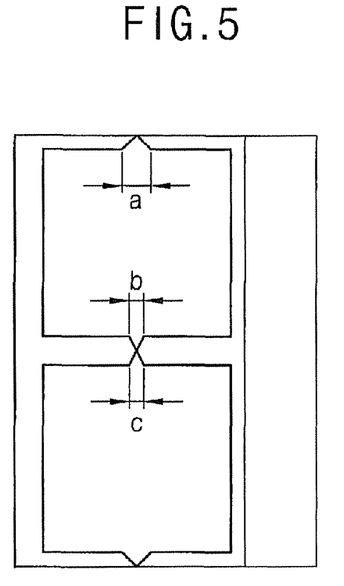
FIG. 5 is a plan view layout showing a plurality of display apparatus substrates arranged on a mother substrate by a drawn seal line according to another exemplary embodiment of this invention.

FIG. 3, FIG. 4 and FIG. 5 are showing variations of the above exemplary embodiment of FIG. 2 and layouts showing closed loops 231 and 232 in more detail. Two closed loops are drawn by the method of this embodiment, and each of them has two protrusions 233-1 and 234-1. The first protrusion 233-1 of the seal line 230 is located on the opposite side of the second protrusion 234-1 which contacts a protrusion 233-2 of an adjacent closed loop 232. The protrusion is not limited to a triangular shape (e.g., a mountain shape). For example, an arc shape is also contemplated, but is not limited thereto. Moreover, the shapes of the first protrusion 233-1 and the second protrusion 234-1 are not needed to be symmetric or the same shapes. For example, one may be a mountain shape and the other may be an arc shape. The size of the first and second protrusions also is not restricted.

As shown in FIG. 3, a gap of the first protrusion 233-1 of the first closed loop 231, "a" is different from that of the second protrusion 234-1 of the first closed loop 231, "b", and "b" equals a gap of the first protrusion 233-2 of the second closed loop 232, "c". Hereon, a gap of a protrusion means a distance between two starting points of the bottom of a protrusion. However, in FIG. 4, the "a" equals the "b." In FIG. 5, the "a" is different from "b", but the "b" is the same as the "c". In the case that the vertical angles of the protrusions are same as each other, the height of the protrusion is commensurate with the corresponding gap as illustrated in FIG. 3, FIG. 4, or FIG. 5. Therefore, in FIG. 3 the heights of the two protrusions are different, in FIG. 4 they are the same, and in FIG. 5 they are different from each other.

As another variation of this invention, it is contemplated that two vertical angles at the point of contact are different. In this case, many exemplary embodiments are available by means of combinations of a gap, a height and a vertical angle. In the case the shape of the protrusion is different from a triangular protrusion as illustrated, for example, an arc shape, many exemplary embodiments are contemplated by varying combinations of a gap, a height and a shape of the arc.

Figure 6:
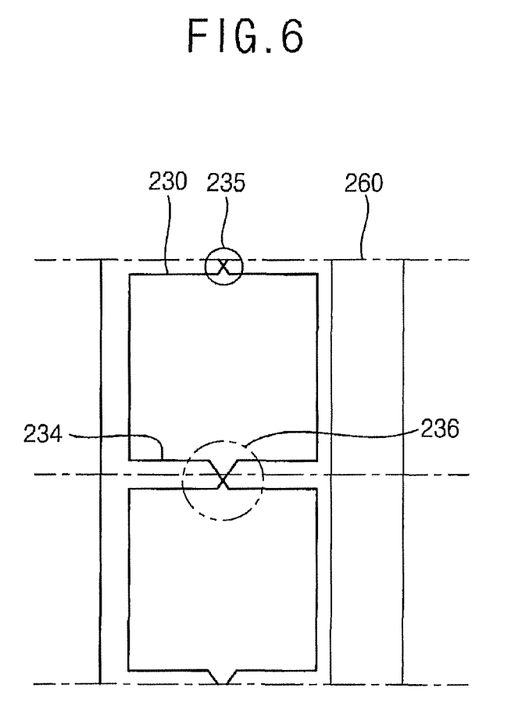
FIG. 6 is a plan view layout illustrating a method of making a display apparatus substrate using a vacuum injection method, the seal line of which is drawn by a method according to one exemplary embodiment of this invention.
Figure 7:
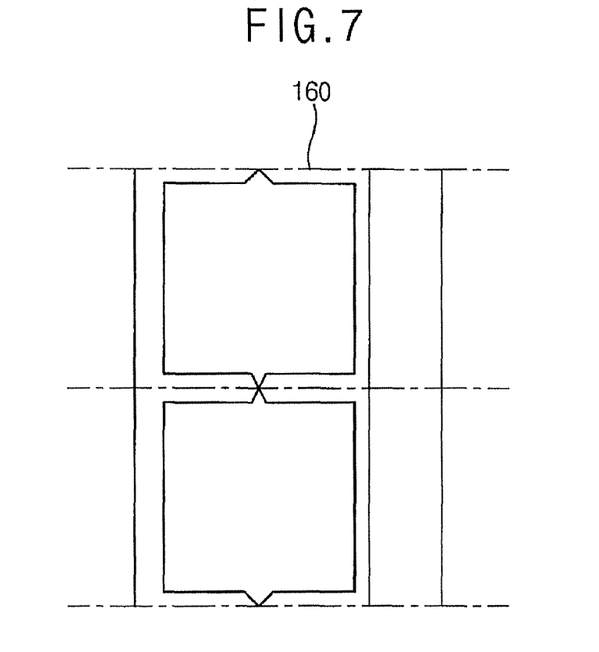
FIG. 7 is a plan view layout illustrating a method of making a display apparatus substrate using a one drop filling method, the seal line of which is drawn by a method according to another exemplary embodiment of this invention.

FIG. 6 and FIG. 7 illustrate a separating method, a succeeding step following drawing steps in which the seal line is drawn on the mother substrate according to one of the methods of FIG. 3 though FIG. 5.

After the seal line is drawn, the mother substrate is assembled with another upper mother substrate using the seal therebetween. The upper mother substrate is a transparent glass formed with color filters and a common electrode used generally in an active matrix type LCD.

FIG. 6 shows a cutting line 260 to separate the assembled mother substrate into display apparatus substrates for the vacuum injection method. In the case that the seal line has been drawn as in FIG. 3, the cutting line is substantially a mid line between the two adjacent closed loops in a stick.

After cutting along the cutting line, each display apparatus substrate has a liquid crystal ("LC") injection hole 236 made from one of the respective protrusions and a point of contact 235 of the seal line 230. Hereon, the cutting line is not required always to be the mid line, as it may be adjusted according to design rules or suitable to the desired end purpose.

In the mother substrate prepared along the method illustrated in FIG. 4, a cutting line could be close to the display apparatus substrate which will have an LC injection hole 236. This method may apply to the exemplary embodiment in FIG. 5 as well.

FIG. 7 shows a cutting line 260 to separate the assembled mother substrate into display apparatus substrates for the one drop filling method.

As described above, an assembling step is needed before the separating process. When separating the assembled mother substrate into display apparatus substrates, each of the display apparatus substrates is cut along the cutting line 260 which runs through a point of contact of the seal. Therefore, in all of the exemplary embodiments of FIG. 3 through FIG. 5, the substrates are cut substantially in the middle of a point of contact.

Figure 8:
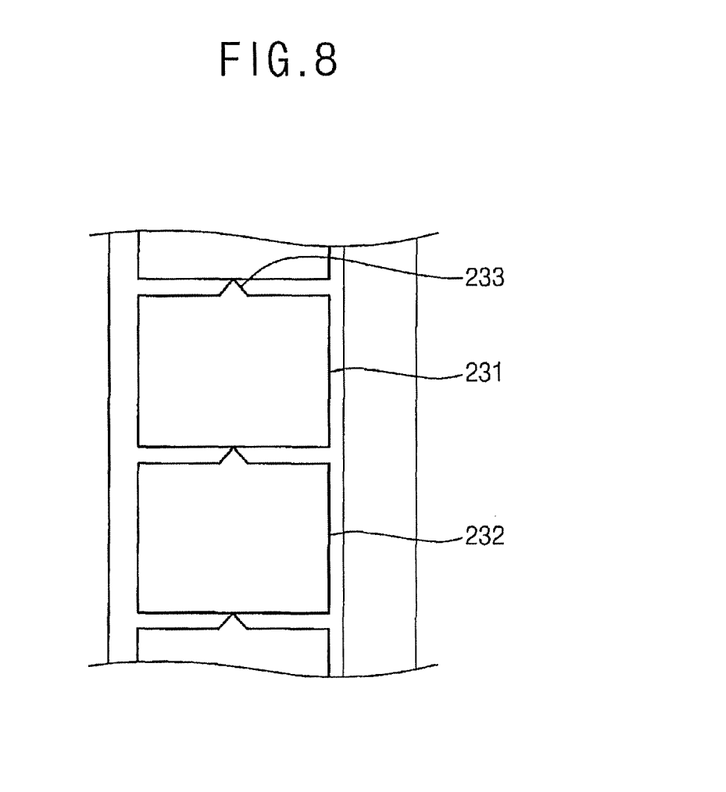
FIG. 8 is a plan view layout showing a display apparatus substrate arranged on a mother substrate by a drawn seal line according to one exemplary embodiment of this invention.
Figure 9:
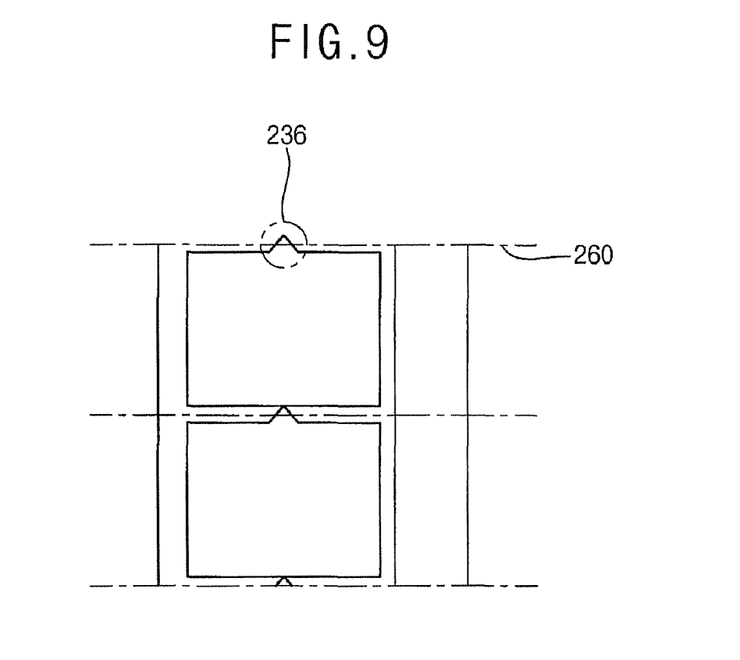
FIG. 9 is a plan view layout illustrating a method of making a display apparatus substrate using the vacuum injection method, the seal line of which is drawn by a method according to another exemplary embodiment of this invention as shown in FIG. 8.
Figure 10:
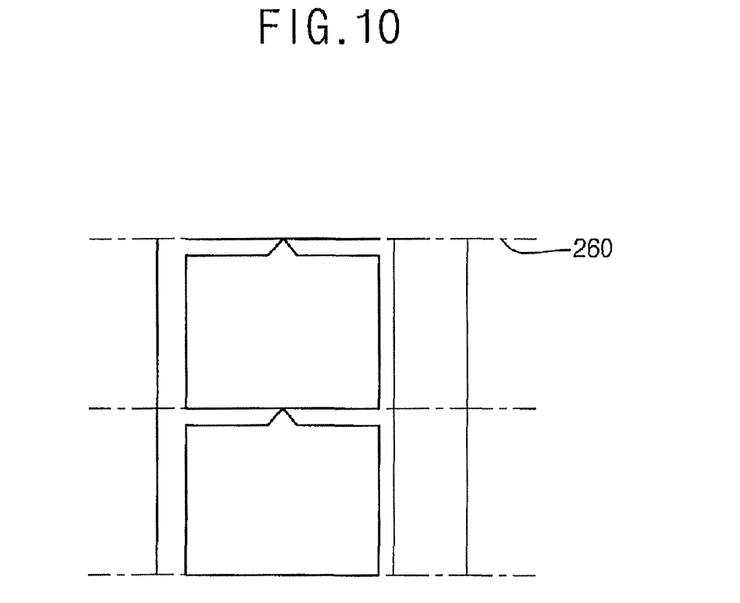
FIG. 10 is a plan view layout illustrating a method of making a display apparatus substrate using the one drop filling method, the seal line of which is drawn by a method according to another exemplary embodiment of this invention as shown in FIG. 8.

FIG. 8, FIG. 9, and FIG. 10 illustrate a mother substrate on which a seal line is drawn according to other exemplary of embodiments of this invention.

FIG. 8 shows the seal line formed on a mother substrate. The seal line comprises a plurality of closed loops 231 and 232 each of which comprises a protrusion 233 between the two closed loops 231 and 232. In other words, the contact point of two adjacent closed loops 231, 232 is on a flat side of one of the closed loops 231, 232.

As shown in FIG. 9, these display apparatus substrates are for the vacuum injection method. The cutting line 260 runs though the middle of two adjacent display substrates in a stick. After separating the mother substrate into display apparatus substrates along a cutting line 260 is completed, the seal line 260 has a protrusion 233 which includes an LC injection hole 236 and a dummy pattern 236-1 on the opposite side of the protrusion 233, which includes branches protruding at the point of contact. Similarly as described above, the shape of the protrusion 233 does not need to be symmetric, of the same shape, or a mountain like shape as illustrated in FIG. 9. For example, a circular arc, a hexagonal shape, or the like are contemplated in alternative exemplary embodiments.

FIG. 10 shows a mother substrate for the one drop filling method. The cutting line 260 extends in a straight line and extends through the point of contact.

In active matrix LCD driving circuits for scanning signal lines (so-called gate lines) or data signal lines (so-called data lines) are necessary for driving TFTs and pixel electrodes on the display apparatus substrate. Especially, in these exemplary embodiments, the gate driving circuit comprises amorphous silicon TFTs for reducing non-display areas. In which case, it is required that the gate driving circuits are located under the seal line. The seal line on the gate driving circuits reduces the distortion of scanning signals because the seal line has a fixed dielectric constant compared to liquid crystal which has dielectric isotropy character. The seal line may include hard spacers or elastic ball spacers to support a cell gap between the two substrates. However, elastic ball type spacers are preferably used for the seal line over the gate driving circuits because a hard spacer, for example, glass fiber, may damage the gate driving circuit.

FIGS. 11A through 11E show a method of manufacturing of an exemplary display apparatus using a vacuum injection method, including the above described exemplary embodiments.

Figure 11A:
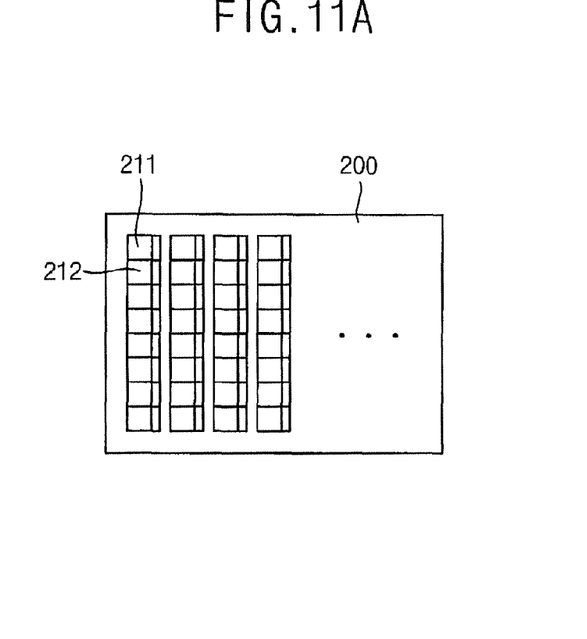
FIGS. 11A through 11E are showing the process for making an LCD apparatus according to another exemplary embodiment of this invention.
Figure 11B:
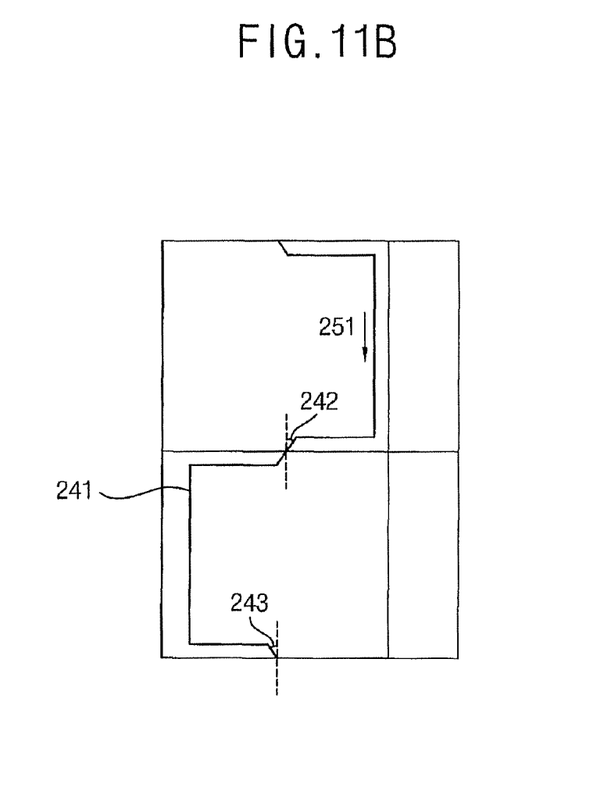
Figure 11C:
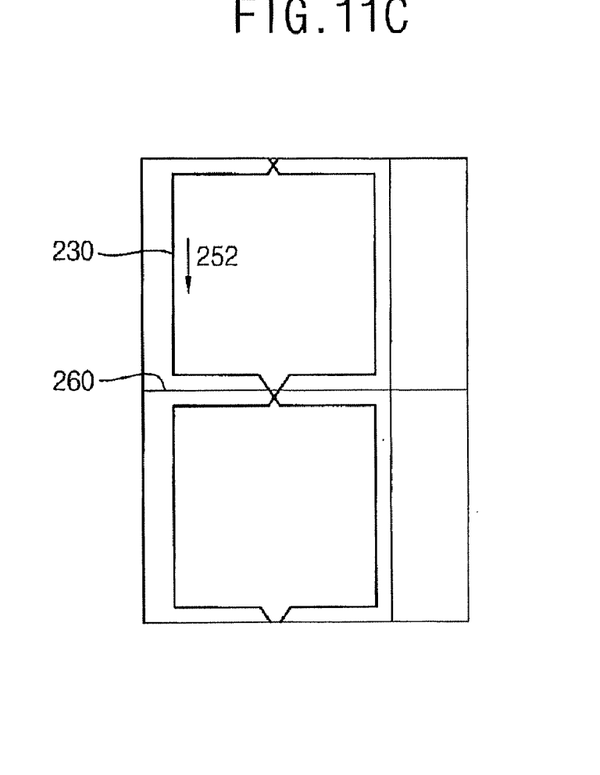
Figure 11D:
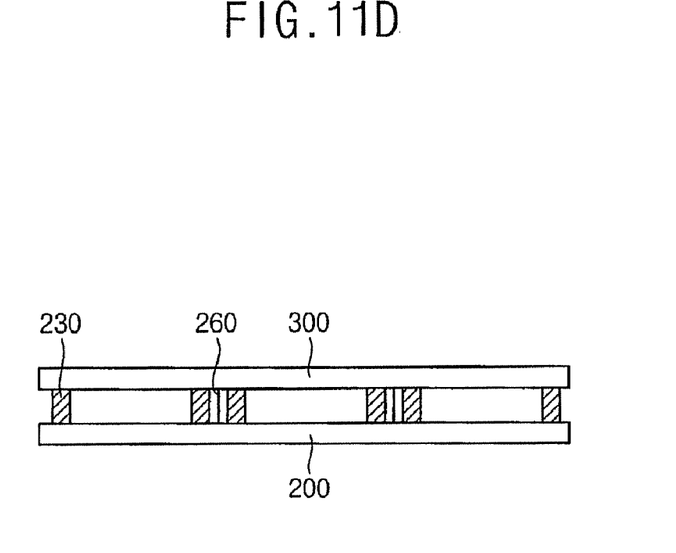

First of all, as shown in FIG. 11A, a mother substrate 200 is prepared. The mother substrate 200, made of glass, forms a plurality of display apparatus substrates 211 and 212, each of which comprises TFTs and pixel electrodes (not shown), in a line. The stick, which is a column of a plurality of display apparatus substrates 211 and 212 arranged in a line, is spaced apart by as much as a cutting margin from adjacent stick, and the display apparatus substrates in a stick are also spaced apart by as much as a cutting margin. Moreover, a non-display area in which driving circuits could be formed thereon should be considered. In FIG. 11B, the seal line is drawn by a nozzle (not shown) which contains glue seal material. From a starting point, the nozzle runs around side of a display apparatus substrate, transfers to the next substrate, surrounds the next substrate, and then forms a closed loop by contacting the prior drawn seal line 230r, and a point of contact 243 between two adjacent display apparatus substrates as shown in FIGS. 11B and 11C. In more detail, as shown in FIG. 11B, the seal line runs along a side of one of the display apparatus substrates by beginning from the left side of a virtual line 241 which run parallel to the horizontal direction of the stick near a display apparatus substrate. It runs rightward, turns right with substantially a 90° angle at a first corner, runs along a right side of the substrate downward as illustrated with line 251, and turns right with substantially a 90° angle again at a second corner. Near the virtual line 241, it crosses the virtual line 241 with an angle 242 under 90°, and then runs along the next display apparatus substrate. After it runs in a similar way to the above, it crosses the virtual line 241 with the second angle 243 at an angle under 90° again. Repeating the above described method, the seal line 230 is completed with line 251 in a direction as illustrated in FIG. 11C. The points of contact are located every between two adjacent display apparatus substrates. FIG. 11D shows a cross sectional view of the mother substrate 200 assembled with an upper mother substrate 300 on which a plurality of color filters and a common electrode (both not shown) are generally formed. The upper mother substrate 300 is disposed on the mother substrate 200 and is then pressed by a tool with heat or ultraviolet ("UV") light on the seal line 230. This process comprises a few steps. First, two display apparatus substrates are aligned, secondly the assembled substrates are temporarily fixed by UV light or pressed with heat on the seal line 130, and finally they are pressed with high pressure and high temperature. Preferably, the process of assembly is conducted in a vacuum chamber to prevent the seal line from bursting when pressed.

A separating process follows the assembling process. FIG. 11C and FIG. 11D show a cutting line 260. First, the assembled mother substrate is scribed by a diamond wheel along the cutting line 260 in order to form cracks mechanically. The assembled mother substrate is then broken into individual display apparatus substrates by pressing the cracks with a mechanical tool, compressed air, or steam, for example, but is not limited to the foregoing. As another example, a laser breaking method may be used in this step.

Figure 11E:
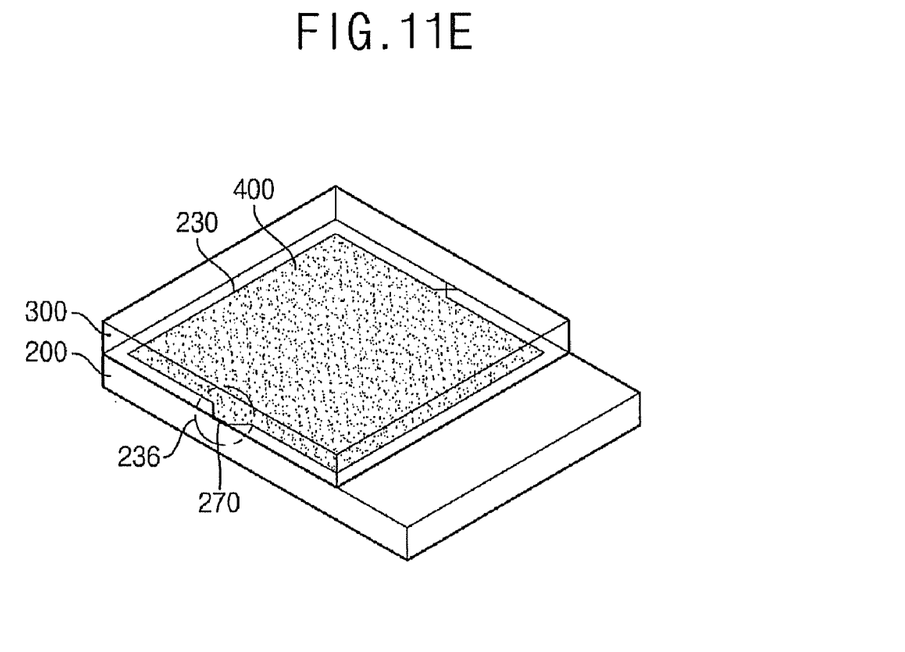

An LC filling step follows the separating step. In a vacuum chamber, liquid crystal 400 is filled into the assembled substrate through an LC injection hole 236 as illustrated in FIG. 11E. The LC injection hole 236 is sealed by so-called end seal 270, which is harden by UV light.

As described above, the display apparatus substrates 200, 300 comprises a seal line having the first protrusion which has an LC injection hole 236 and a point of contact, an end seal 270, and liquid crystal 400 therebetween.

Figure 12A:
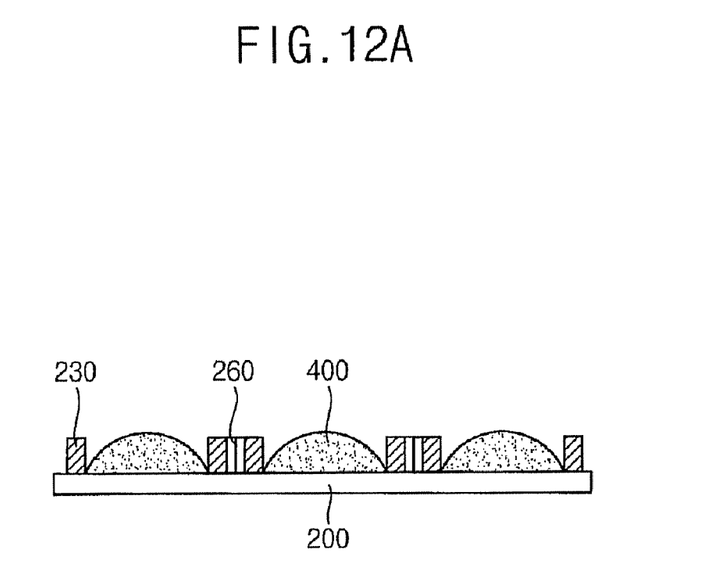
FIGS. 12A through 12C are showing the process for making an LCD apparatus according to another exemplary embodiment of this invention.
Figure 12B:
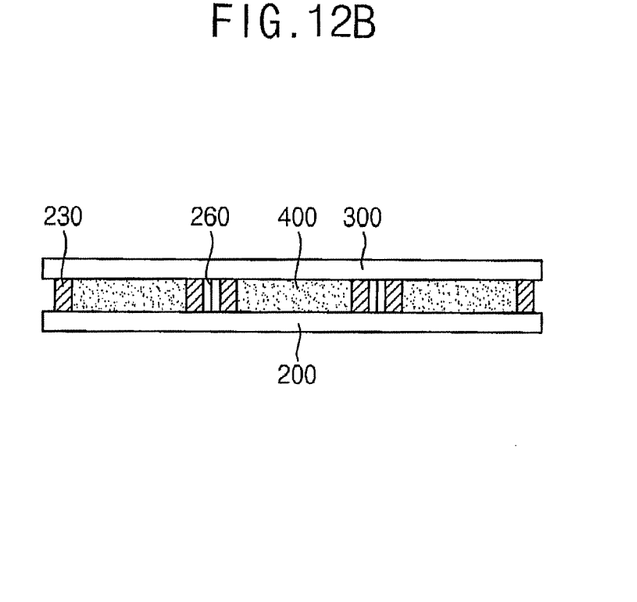
Figure 12C:
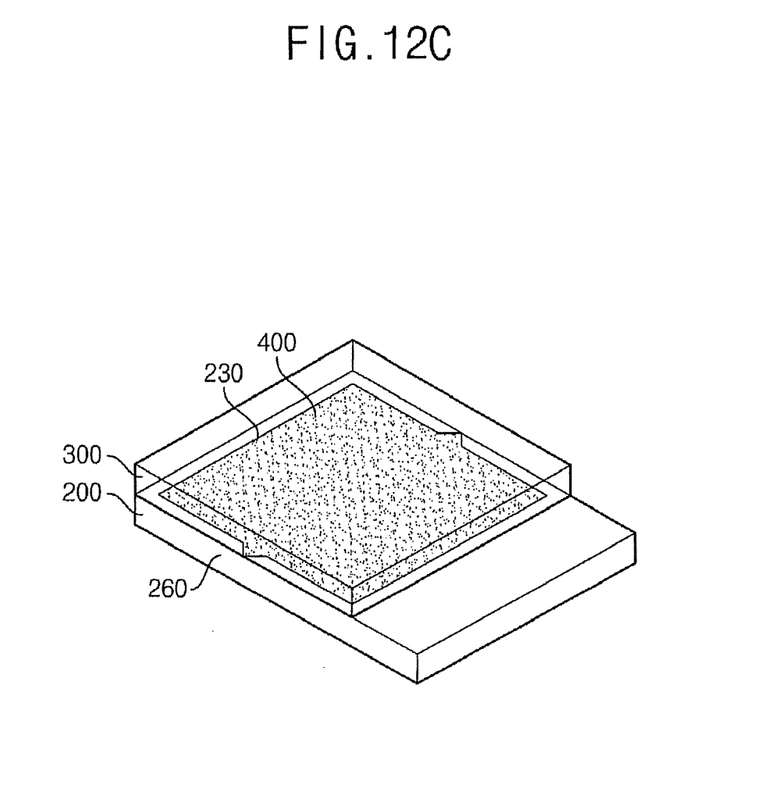

FIGS. 12A through 12C show a method of manufacturing of a display apparatus by using a one drop filling method including the seal line of the above embodiments according to another exemplary embodiment of the present invention.

After the seal line 230 is drawn, a predetermined amount of liquid crystal 400 is dropped in a boundary defined by the seal line 230 as shown in FIG. 12A and dispersed on an entire surface of the substrate 200. Similar to the exemplary embodiments in FIG. 11D and FIG. 11E, assembling and separating steps follow. However, the cutting line 260 is different as already mentioned in the other exemplary embodiments. The cutting line always runs through the point of contact of the seal line 230 as shown in FIG. 12 B and FIG. 12C corresponding to the cutting line 260. There is no need for an end seal process in this exemplary embodiment. The display apparatus substrate for the one drop filling method comprises a seal line 230 which constitutes an enclosed closed loop and has at least one protrusion or two.

In all of the exemplary embodiments of this invention, it is mentioned that the mother substrate comprises TFTs and pixel electrodes and the upper mother substrate comprises color filters and a common electrode. However, this invention is not restricted to this configuration, for example, as there are no TFTs in a simple matrix type LCD, and the two substrates could change their roles. For example, the seal line could be formed on the mother substrate having color filters.

While the present invention has been shown and described with reference to certain preferred exemplary embodiments thereof, it will be understood by those skilled in the art that various changes in form and details may be made therein without departing from the spirit and scope of the present invention as defined by the appended claims.

What is claimed is:

1. A display apparatus comprising:
a substrate having a rectangular shape, and;
a seal line formed on the substrate, wherein the seal line has a first protrusion including a cross point of the seal line on a first side of the substrate, the first protrusion being formed between both corners of the first side of the substrate, and a second protrusion including an opening of the seal line on a second side opposite to the first side having the first protrusion, the second protrusion being formed between both corners of the second side of the substrate.

2. A display apparatus of claim 1, wherein the cross point forms vertical angles.

3. A display apparatus of claim 2, wherein a gap of a bottom of the first protrusion and a gap of a bottom of the second protrusion are same.

4. A display apparatus of claim 2, wherein a gap of a bottom of the first protrusion and a gap of a bottom of the second protrusion are different.

5. A display apparatus of claim 1, wherein vertical angles formed by the cross point of the first protrusion are different from each other.

6. A display apparatus of claim 5, wherein a gap of a bottom of the first protrusion and a gap of a bottom of the second protrusion are same.

7. A display apparatus of claim 5, wherein a gap of a bottom of the first protrusion and a gap of a bottom of the second protrusion are different.

8. A display apparatus of claim 1, further comprising a gate driving circuit under the seal line.

9. A display apparatus of claim 1, further comprising a non-display area having a data driving circuit.

10. A display apparatus of claim 9, wherein the non-display area is located outside of the seal line.

11. A display apparatus of claim 9, wherein the seal line contains spacers.

12. A display apparatus comprising;
a substrate having a rectangular shape, and
a seal line formed around the substrate, wherein the seal line is a closed loop comprising a first protrusion defined by a first cross point of the seal line between both corners of a first side of the substrate and a second protrusion defined by a second cross point of the seal line between both corners of a second side opposite to the first side having the first protrusion,
wherein a vertical angle of the first protrusion is different from that of the second protrusion.

13. A display apparatus of claim 12, wherein the first protrusion and the second protrusion form a mountain figure or an arc figure relative to a proximate portion of the seal line.

14. A display apparatus of claim 13, wherein a gap of a bottom of the first protrusion and a gap of a bottom of the second protrusion are the same.

15. A display apparatus of claim 14, further comprising a gate driving circuit under the seal line.

16. A display apparatus of claim 15, wherein the first protrusion includes a cross point of the seal line on the first side of the substrate, the cross point forms vertical angles being different from each other.

17. A display apparatus of claim 15, wherein a vertical angle of the first protrusion is different from that of the second protrusion.

18. A display apparatus of claim 13, wherein a gap of a bottom of the first protrusion is different from that of the second protrusion.

19. A display apparatus of claim 18, further comprising a gate driving circuit under the seal line.

20. A display apparatus of claim 19, wherein a vertical angle of the first protrusion is the same as that of the second protrusion.

21. A display apparatus of claim 12, further comprising a non-display area having a data driving circuit.

22. A display apparatus of claim 21, wherein the non-display area is located outside of the seal line.

23. A display apparatus of claim 12, wherein the seal line contains spacers.

* * * * *